(12) United States Patent
Keijzers

(10) Patent No.: US 11,132,769 B2
(45) Date of Patent: Sep. 28, 2021

(54) IMAGE QUALITY BY TWO PASS TEMPORAL NOISE REDUCTION

(71) Applicant: KONINKLIJKE PHILIPS N.V., Eindhoven (NL)

(72) Inventor: Bruno Keijzers, Best (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 141 days.

(21) Appl. No.: 16/086,684

(22) PCT Filed: Mar. 16, 2017

(86) PCT No.: PCT/EP2017/056190
§ 371 (c)(1),
(2) Date: Sep. 20, 2018

(87) PCT Pub. No.: WO2017/162507
PCT Pub. Date: Sep. 28, 2017

(65) Prior Publication Data
US 2019/0043173 A1     Feb. 7, 2019

(30) Foreign Application Priority Data

Mar. 23, 2016 (EP) .................................... 16161833

(51) Int. Cl.
*G06K 9/40* (2006.01)
*G06T 5/00* (2006.01)

(52) U.S. Cl.
CPC .... *G06T 5/002* (2013.01); *G06T 2207/10016* (2013.01); *G06T 2207/20182* (2013.01)

(58) Field of Classification Search
CPC ........... G06T 5/002; G06T 2207/10016; G06T 2207/20182
See application file for complete search history.

(56) References Cited

U.S. PATENT DOCUMENTS 4,504,908 A * 3/1985 Riederer ................ A61B 6/481
128/922
5,543,858 A * 8/1996 Wischermann ........ H04N 5/144
348/618

(Continued)

FOREIGN PATENT DOCUMENTS

WO    2015049103 A1    4/2015

OTHER PUBLICATIONS

Lee et al., "Two-way partitioning of a recursive Gaussian filter in CUDA", EURASIP Journal on Image and Video Processing pp. 1-12, 2014.*

(Continued)

*Primary Examiner* — Samir A Ahmed

(57) ABSTRACT

An image processor (IP) and a related method. The processor (IP) comprises an input interface (IN) for receiving an input sequence (F) of frames acquired by an imaging apparatus (IA). A temporal noise filter (NP) of the processor (IP) is configured to bidirectionally process the input sequence into at least two noise processed sequences ($F^{LR}$, $F^{RL}$). A merger (SUM) of the processor (IP) is configured to merge said at least two noise processed sequences into an output sequence (Formula (A)).

16 Claims, 6 Drawing Sheets

(56) References Cited

U.S. PATENT DOCUMENTS

| | | | | |
|---|---|---|---|---|
| 5,689,592 | A * | 11/1997 | Ericsson | G06F 7/505 360/39 |
| 6,823,078 | B1 * | 11/2004 | Florent | G06T 5/50 378/19 |
| 7,050,501 | B2 * | 5/2006 | Alvarez | H04N 5/21 348/701 |
| 7,317,841 | B2 * | 1/2008 | Yatsenko | G06T 5/002 382/260 |
| 8,760,466 | B1 | 6/2014 | Kass | |
| 2006/0044475 | A1 * | 3/2006 | Lin | H04N 5/21 348/700 |
| 2006/0232710 | A1 | 10/2006 | Zhou | |
| 2007/0164856 | A1 * | 7/2007 | Egner | G06K 9/222 340/539.13 |
| 2008/0253679 | A1 | 10/2008 | Takahashi | |
| 2010/0165206 | A1 | 7/2010 | Nestares | |
| 2016/0232648 | A1 * | 8/2016 | Bertens | G06T 5/002 |
| 2016/0292837 | A1 * | 10/2016 | Lakemond | G06T 5/20 |
| 2017/0161893 | A1 * | 6/2017 | Carnes | G06T 19/006 |
| 2019/0172183 | A1 * | 6/2019 | Csefalvay | G06T 5/20 |

OTHER PUBLICATIONS

Jingjing Dai et al., "Generalized multihypothesis motion compensated filter for grayscale and color video denoising" Signal Processing 93, pp. 70-85, (2013).*

S. Cuomo et al. "A Revised Scheme for Real Time ECG Signal Denoising based on Recursive Filtering" Biomedical Signal Processing and Control • Jun. 2015.*

YOO et al., "Spatial-Temporal Noise Reduction Filter for Image Devices", International Conference on Control Automation and Systems, Seoul Korea, Oct. 14-17, 2008.*

Brailean, J.C. et al "Noise Reduction Filters for Dynamic Image Sequences: A Review", Proceedings of the IEEE, vol. 83, No. 9. 1995, pp. 1272-1291.

* cited by examiner

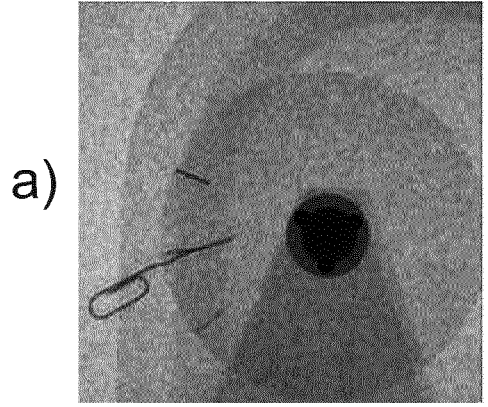
a)
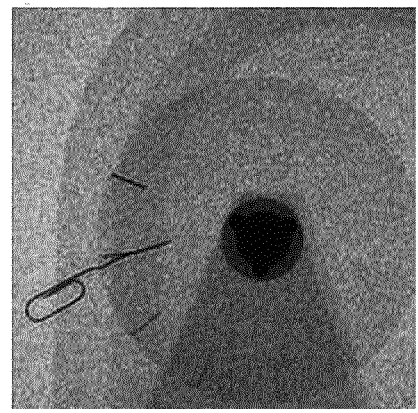
a)
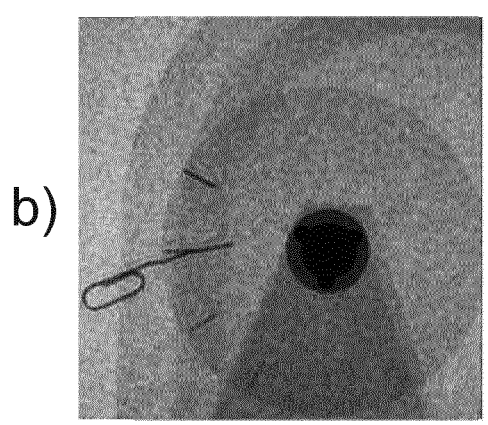
b)
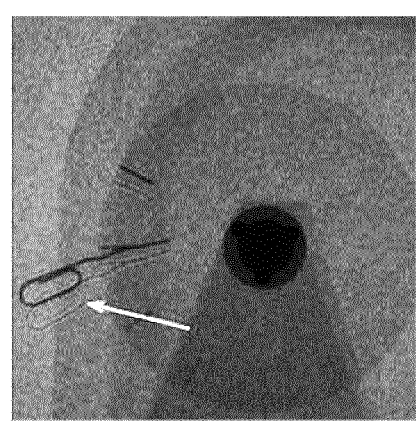
b)
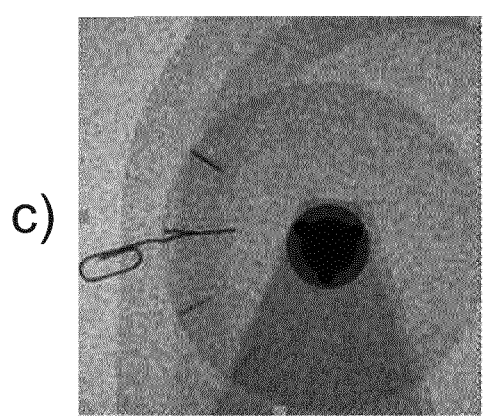
c)
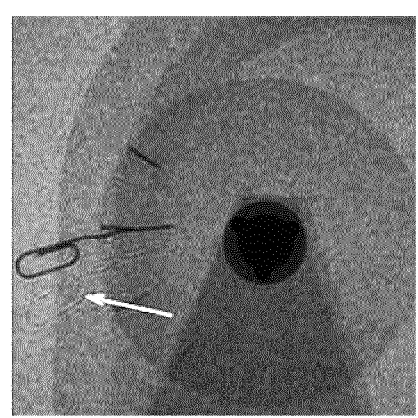
c)
Fig. 4A
Fig. 4B

IMAGE QUALITY BY TWO PASS TEMPORAL NOISE REDUCTION

CROSS-REFERENCE TO PRIOR APPLICATIONS

This application is the U.S. National Phase application under 35 U.S.C. § 371 of International Application No. PCT/EP2017/056190, filed on Mar. 16, 2017, which claims the benefit of European Patent Application No. 16161833.5, filed on Mar. 23, 2016. These applications are hereby incorporated by reference herein.

FIELD OF THE INVENTION

The invention relates to an image processor, to an image processing method, to an image processing system, to a computer program element, and to a computer readable medium.

BACKGROUND OF THE INVENTION

In medical imaging image quality is important to safeguard for instance diagnostic or interventional procedures. One important indicator for image quality is the level of noise in the acquired imagery. One way to reduce noise level is to use recursive noise reduction filters. It has been observed however that image noise in a sequence of images processed by such filters is unevenly distributed across the sequence.

SUMMARY OF THE INVENTION

There may therefore be a need for imaging processing methods and related systems to improve image quality.

The object of the present invention is solved by the subject matter of the independent claims where further embodiments are incorporated in the dependent claims. It should be noted that the following described aspect of the invention equally applies to the image processing method, the image processing system, to the computer program element and to the computer readable medium.

According to a first aspect of the invention there is provided an image processor, comprising:
an input interface for receiving an input sequence of frames acquired by an imaging apparatus;
at least one temporal noise filter configured to bi-directionally process the input sequence into at least two noise processed sequences; and
a merger configured to merge said at least two noise processed sequences into an output sequence.

According to one aspect, the bidirectional temporal noise processing is recursive.

The input frames are processed bi-directionally or in "two-pass" by progressing through the input sequence in one direction (e.g., from the first frame to the final frame of the input sequence) to obtain the first noise processed sequence and then the noise processing is run the opposite direction through the (or a copy of) input sequence to obtain the second noise processed sequence. The merging of the two sequences obtained through the bi-directional processing allows cross-harnessing noise information present in one of the noise processed sequences to compensate a lack thereof in the other image processed sequence. The lack of noise information may relate to the recursive nature of the noise filter. An overall noise reduction in the merged sequence can be achieved in this manner. More particularly, and in one embodiment, the proposed image processor allows achieving a noise (power) level that is essentially constant throughout at least an initial or terminal portion of the output sequence.

According to one aspect, the merger is configured to replace at least one frame from an initial section of one of the at least two noise processed sequences by a corresponding frame from one other of the at least two noise processed sequences. The Replacing operation is to be construed broadly to not only include modification of one of the first or second noise processed sequences but also to include copying from at least one of the two noise-processed sequences into a third sequence where no modification of one of the first or second noise processed frames occurs.

According to one aspect, the merger is configured to average frames from the two noise processed sequences. In particular, a weighted averaging scheme is used. In one embodiment, the averaging is configured to account for motion of an imaged object during acquisition of the input sequence.

According to another aspect, there is provided an image processing method, comprising:
receiving an input sequence of frames acquired by an imaging apparatus;
applying bidirectional temporal noise processing to the input sequence to produce at least two noise processed sequences; and
merging said at least two noise processed sequences into an output sequence.

According to one embodiment, the bidirectional temporal noise processing is recursive.

According to one embodiment, said merging includes replacing at least one frame from an initial section of one of the at least two noise processed sequences by a corresponding frame from one other of the at least two noise processed sequences.

According to one embodiment, said merging includes averaging frames from the two noise processed sequences.

According to one embodiment, a noise power level is essentially constant throughout at least an initial or terminal section of the output sequence.

The input frames are any one of i) X-ray frames, ii) ultrasound frames and iii) magnetic resonance frames. In one embodiment, the acquired frames of the input sequence encode a moving object.

According to another aspect, there is provided an image processing system, comprising:
an image processor as per any of the above mentioned embodiments;
the imaging apparatus supplying the input sequence of frames.

According to another aspect, there is provided a computer program element, which, when being executed by a processing unit, is adapted to perform the method of any one the above mentioned aspects.

According to another aspect, there is provided a computer readable medium having stored thereon the program element as mentioned above.

BRIEF DESCRIPTION OF THE DRAWINGS

Exemplary embodiments of the invention will now be described with reference to the following drawings wherein:

FIG. 4 shows exemplary imagery obtained herein;

DETAILED DESCRIPTION OF EMBODIMENTS

Figure 1:
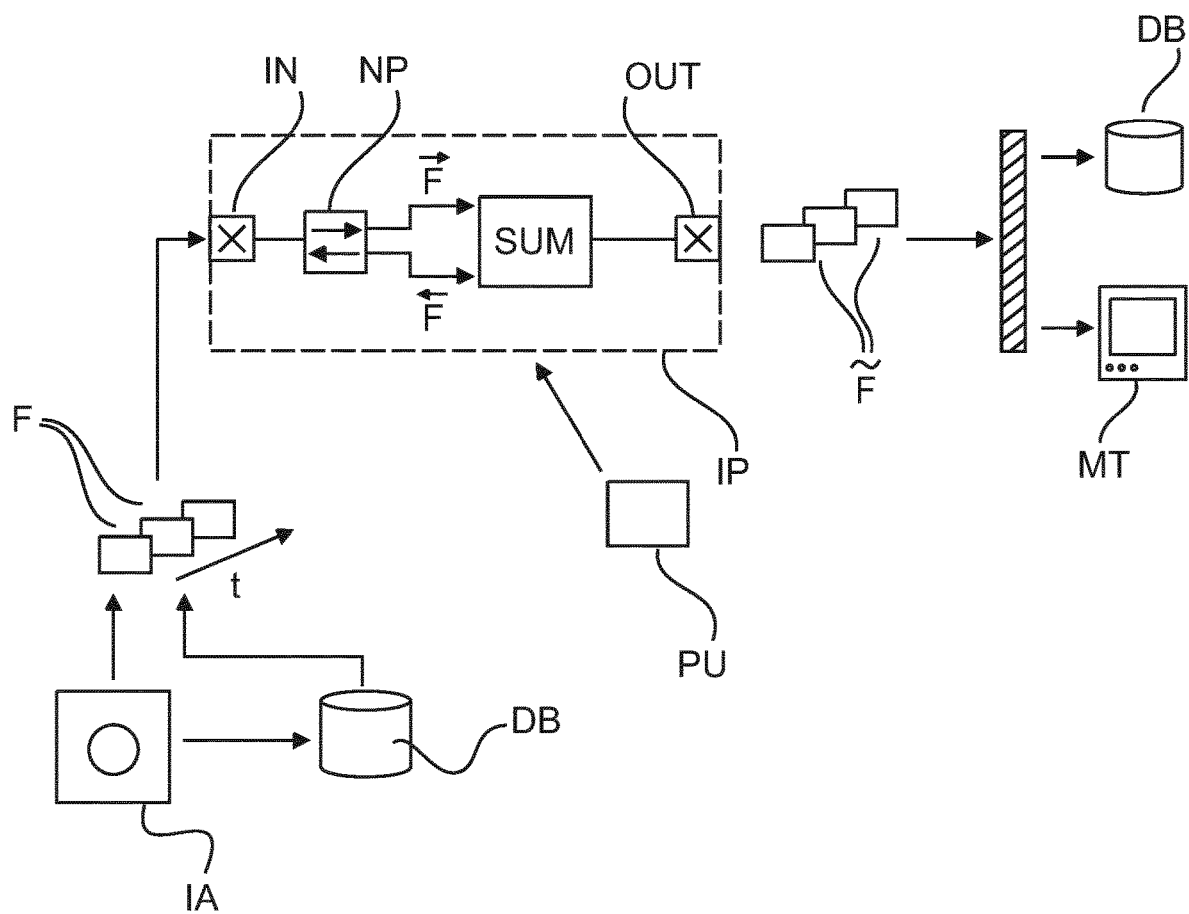
FIG. 1 shows a schematic block diagram of an imaging arrangement including an image processor.

With reference to FIG. 1, there is shown an image processing system IPS. The image processing system IPS comprises an imaging modality or imaging apparatus (referred to herein as the "imager IA") that supplies a stream (that is, a sequence) of images. The images in the sequence are referred to herein as "frames".

The image sequence F is processed by an image processer IP to reduce noise in the frames of the input sequence F. In one embodiment, the imager AI is an x-ray imager used in a fluoroscopic imaging procedure to provide image guided support to an intervention. Exemplary applications of such X-ray imagers IA are cardiac imaging where a catheter is introduced into the patient.

The object or region of interest to be imaged such as the heart for instance may be moving or may be deforming whilst the image sequence F is acquired by the imager IA, the image sequence F thus encoding motion of the object.

A number of different modalities are envisaged herein. For instance, the imager IA may be a CT imager instead of an interventional C-arm x-ray imager preferably contemplated herein. In another embodiment, the imager IA is an ultra sound or magnetic resonance imager.

Depending on the imaging modality used, a detector device of the imager IA detects image signals which are converted by analogue-digital-circuitry into numbers, referred to herein as image or pixel or voxel values. Depending on whether the acquired imagery is 2D or 3D (either one being envisaged herein), these image values are arranged in 2D or 3D arrays, respectively. Although in the following we will mainly make reference to 2D imagery, this is not to limit the following description as 3D imagery which is also specifically envisaged herein. Also, as far as the CT context is concerned, the following described system and method can be applied in projection domain or imaging domain.

An individual frame acquired at time instance t will be referred to as $I_t$ and $I_t(x,y)$ denotes the pixel in that frame at position x,y, with image coordinates x,y indicating columns and rows in the 2D array. The skilled person will appreciate that these notations and terminologies can be readily extended to 3D imaging.

The frames $I_t$ in the input sequence F are preferably acquired in an imaging run at a fixed or variable frame rate fps. In the fluoroscopic setting and given a frame rate of about 5 to 15 (e.g., 7.5) frames per second, the input sequence F generally comprises frames in the order of tens or hundreds. Although each frame can be viewed on a display device such as a monitor MT as a still image, what is preferably contemplated herein is visualization in a video or cine sequence. This is achieved by using video controller (not shown) that effects displaying on the display device MT of the frames $I_t$ in rapid enough succession, one at a time, to so confer to the viewer the impression of a moving picture. In this way the dynamics of the moving object can be studied. In principle, the acquired sequence can be displayed on the monitor MT "live", that is, the display is effected in real time whilst the image frames $I_t$ are acquired. What is mainly envisaged herein however is displaying of the imagery in review mode. In this mode, the frames $I_t$ are not directly displayed during acquisition (although this can still be done) but are preferably captured first in a buffer or other memory such as a database such as a RIS or PACS (picture archiving) of a hospital information system (HIS) or other, schematically indicated in the block diagram in FIG. 1 as a DB.

Specifically, in review mode, the captured It are not rendered for display whilst they are acquired but are only displayed after a complete run of frames have been acquired. In other words, a complete input sequence is acquired first, is stored and then processed by an image processor IP as will be explained in more detail below. During interventions, such as in the cardiac application mentioned above, the review mode is usually invoked right after the imaging run on the spot so in this case the captured images are stored locally in a, preferably quickly accessible, local memory buffer and are then rendered into a video sequence in review mode on the monitor MT located at the imager IA. Permanent storage in the PACS or other central server occurs, if at all, later, e.g., at the conclusion of the procedure.

The image processor IP comprises, as general components, an input port IN where the frames of an input sequence F are received. A noise reduction processor NP (or "noise filter", both will be used interchangeably herein) then processes the input sequence F and produces, as intermediate results, two intermediate image sequences FL and FR of equal length to that of the input frame F. The notations "$F^{LR}$", "$F^{RL}$" for the two intermediate sequences, where "L" indicates "left" and "R" indicates "right", will become apparent shortly. These two intermediate noise processed image sequence $F^{LR}$ and $F^{RL}$ are then merged by a merger SUM into an output sequence $\tilde{F}$ which is output at output port OUT.

The so processed or enhanced noise reduced output sequence $\tilde{F}$ has less noise than the input sequence F and/or shows fewer image artifacts incurred by the motion of the object of interest. The noise reduced and/or motion artifact reduced output image $\tilde{F}$ can be stored in the same or different memory DB and can be rendered for display as still imagery or preferably as video sequence or can be otherwise further image-processed. The input sequence F received at the input port IN may not necessarily be received in one chunk but can also be supplied to the input port of the image processor frame by frame.

The image processor IP can be run wholly on a work station or other general purpose computing device PU associated with the imager IA. As an alternative to this, implementation in a distributed computing architecture is also envisaged, where the processor IP serves a plurality of imagers IA. As a further variant, the image processor IP may be implemented as a mobile image review software module ("mobile app") downloadable and/or executable by or on a handheld device such as a laptop, tablet ("smart"-) phone, etc. The handheld device can be operated to connect to image storage server DB, downloads the image sequence to be reviewed, and the processed output sequence $\tilde{F}$ is the viewable on the native screen of the handheld device. Some or all components of the processor IP may be arranged in hardware such as in a suitably programmed FPGA (field-programmable-gate-array) or as hardwired IC chip.

Referring now in more detail to the noise reduction processor NP, this is in particular envisaged as a temporal noise reduction processor. "Temporal" in this context is taken to mean that the pixels in the frames are processed across the sequence of frames (in time, thus "temporal") and are not necessarily processed spatially within each frame although embodiments are envisaged where temporal filtering is done together with spatial filtering. As shown in the block diagram of FIG. 2, and as specifically envisaged herein in a preferred embodiment, the noise reduction processor NP is of the recursive type. More particularly, and according to one embodiment, the noise processor is based on weighted frame averaging as per:

$$\tilde{I}_{t+\Delta t}(x,y) = W1 \cdot \tilde{I}_t(x,y) + W2 \cdot I_{t+\Delta t}(x,y) \quad (1)$$

Preferably, but not necessarily, the weights are normalized (W1+W2 =1). The noise processed or "enhanced frames" are denoted by symbol $\tilde{I}$, and raw frames are denoted I. "Recursive filtering" as mainly envisaged herein implies that an already enhanced frame at time t is re-used (i.e. retrieved from memory FM) to compute the next enhanced frame at index t+Δt.

In one particular embodiment, the following noise reduction algorithm is used:

$$\tilde{I}_{t+\Delta t}(x,y) = ATR \cdot \tilde{I}_t(x,y) + (1-ATR) \cdot I_{t+\Delta t}(x,y) \quad (1a)$$

Figure 2:
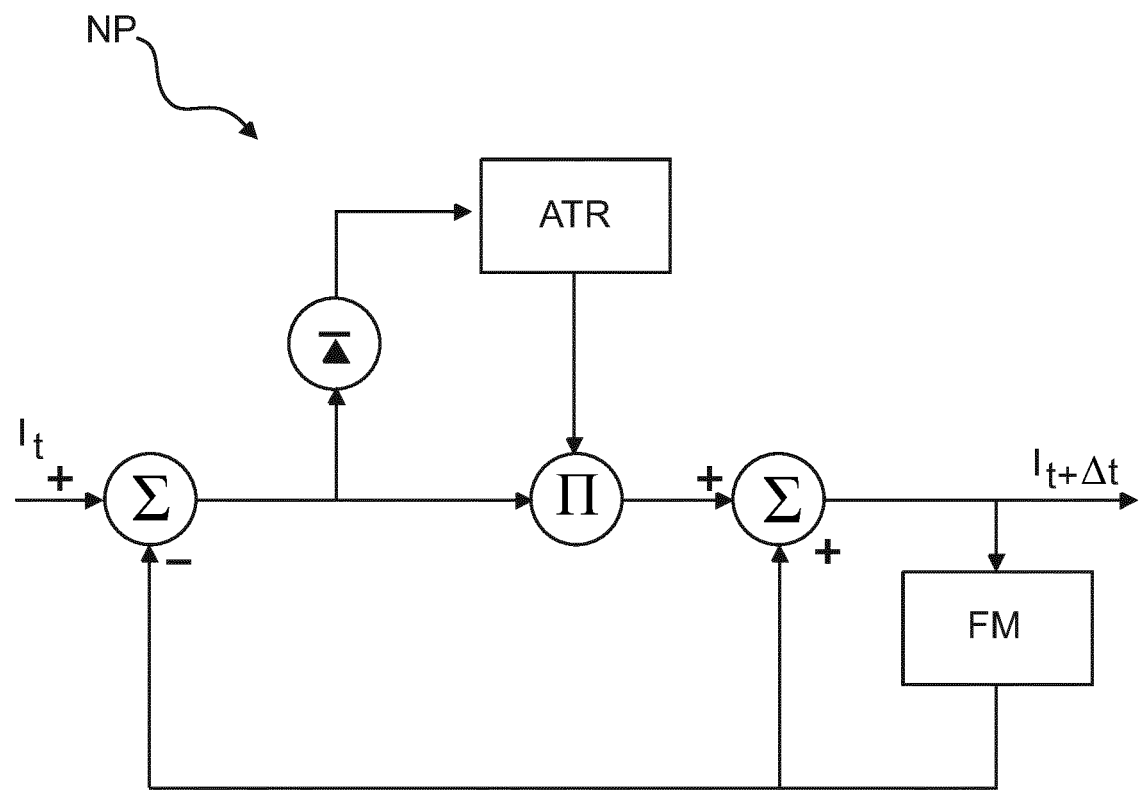
FIG. 2 shows a block diagram of the image processor in FIG. 1.

With continued reference to FIG. 2, the temporal noise processor as per (1a) is not only recursive in nature but it is also "adaptive" in that it includes a motion compensator component as implemented by the weights ATR. The weights ATR (also called K-factors) are a function defined on image pixel differences and the exact nature and profile of the function may differ from application to application. In particular the function depends on the amount of movement of the object during acquisition. Specifically, the (normalized) weights ATR are a function of the difference in pixel value (e.g., gray-value or color value etc.) at pixel coordinate (x,y) between $\tilde{I}_t$ and $I_{t+\Delta t}$. The larger this difference is, the larger is the amount of motion that is assumed to have occurred during Δt, and the smaller the K-factor is (e.g., 0.1). This allows locally compensating for the motion. In other words, the new enhanced frame $\tilde{I}_{t+\Delta t}(x,y)$ is almost equal to the new incoming frame $I_{t+\Delta t}(x,y)$ and the amount of averaging to be performed is reduced as per eq (1a). Conversely, the smaller the pixel difference is (which is taken to indicate that no or only a small amount of motion has occurred), the larger the K-factor (e.g. 0.9), and the previously enhanced frame $\tilde{I}_t(x,y)$ is weighted heavily in the ultimate result $\tilde{I}_{t+\Delta t}(x,y)$. In this case considerable noise reduction is achieved. In order to classify a pixel difference as small or as large, an estimate of the noise level in the image is made. This can be done by using statistical measures. For instance, pointwise statistical variance or standard-deviation, or higher moments are computed in a suitably small neighborhood around the respective pixel and the actual difference is then compared against said statistical measure. The actual pixel difference may then be classified against the 1- or 2-folded standard deviation into "small" or "large". The classification is preferably configured to distinguish between (quantum) noise and intensity changes in the image due to image content change.

Referring back to eqs (1), (1a), it will be understood that other weighted averaging schemes may be used instead, not necessarily related to motion compensation. The weights may also be fixed or may depend on other that pixel difference.

In (1),(1a), we use non-negative integers t=1,2, . . . , T to denote the index of each frame in the sequence although this is only for conceptual simplicity, as other suitable indices may be used in a technical implementation, such as time stamps that indicate the exact time when the respective frame was acquired by the imager. Other suitable indexing includes serial numbers, etc. Any other indexing scheme can be used instead that unambiguously indicates the temporal relationship between the frames and the temporal sequence in which the frames have been acquired. Our notation herein is hence without loss of generality as any such suitable indexing scheme can be mapped to a section of the non-negative integers 1, . . . , T, with "1" the index of the first frame and T the index of the last frame and hence T being the overall length of the imaging run (that is, T is the number of frames in the input sequence F).

As envisaged herein, the temporal noise filter NP processes the input sequence F in a bi-directional manner. In other words, in one step, the temporal noise-filter NP progresses recursively through the input sequence from the first frame towards the final frame. This produces the left-to-right intermediate sequence $F^{LR}$. In addition to this processing the step, the noise reduction processor NP also processes the input sequence in the opposite direction, that is, it progresses through the sequence F from the last frame towards the first frame to so produce the right-to-left intermediate sequence $F^{RL}$. The order in which the two frames $F^{LR}$ and $F^{RL}$ are produced is immaterial. Each of the intermediate results $F^{LR}$, $F^{RL}$ constitute, on their own, a respective one-pass noise filtering, but taken together they form the two-pass output of the proposed noise processor or filter NP.

The bi-directional processing or two-pass processing (where the input sequence is processed in one pass and then again in the opposite direction) allows addressing an issue with recursive filtering from which current one pass filtering schemes suffer and this is now explained in more detail: when examining the functional architecture of the recursive noise processor NP as per eqs (1),(1a) (and/or FIG. 2), it can be seen that the output $\tilde{I}_{t+\Delta t}(x,y)$ of the noise processor NP, for position t+Δt in the input sequence F, is a function of i) the current frame $I_{t+\Delta t}(x,y)$ in F and ii) of a frame $\tilde{I}_t(x,y)$ already processed for an earlier position t. The recursive noise processor NP can hence be said to have a recursive "backward operation window" $w_{bw}$ of "length l", (denoted herein as $w_{bw}$=1). That is, in order to filter a current frame at the given position t+Δ, the filter NP needs to retrieve one earlier processed frame which was computed from an earlier frame t in the sequence. Said differently, the recursive processing with operation window of length one ($w_{bw}$=1) requires as input at least one earlier processed image in order to process the given later frame in the input sequence. This can be readily generalized to recursive filtering with backward operation windows of length larger than 1, such as two, three, etc., all envisaged herein in alternative embodiment. As a consequence of this reaching back in the sequence when processing the frames, the first frames 1, 2 . . . $w_{bw}$ cannot be processed because there is not enough information available, that is, there are not enough earlier frames. The earliest frame that can be processed by such a recursive filter is at index $t=w_{bw}+1$.

Figure 3:
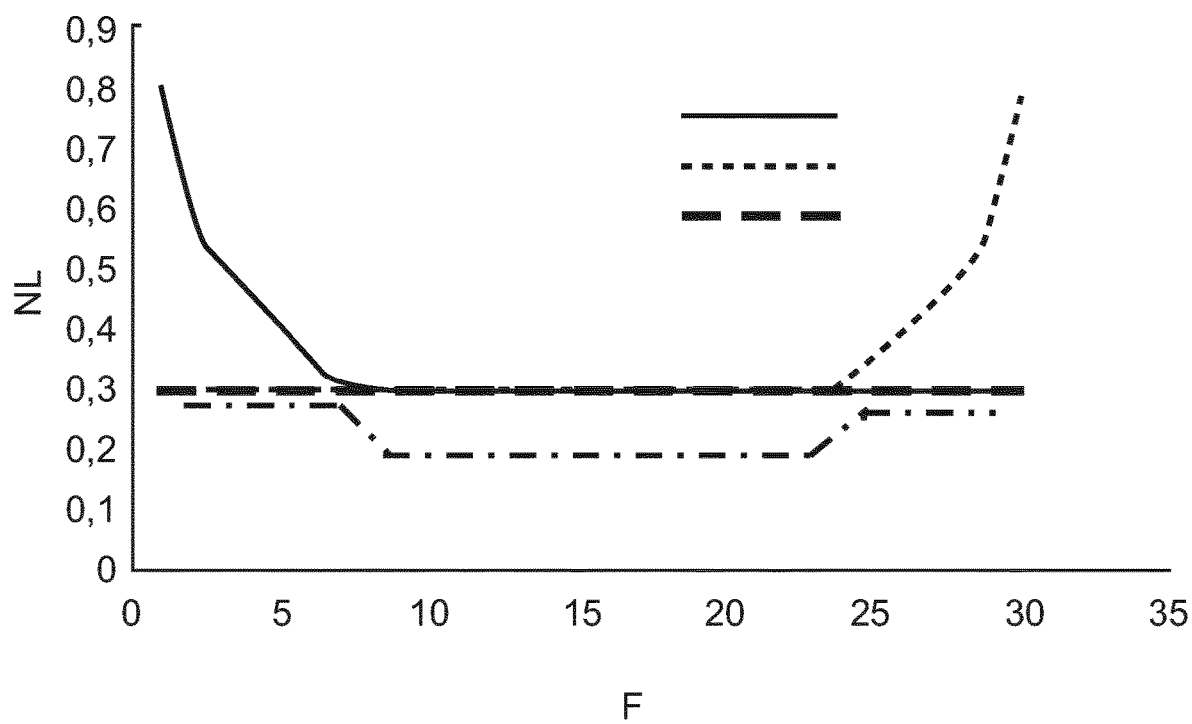
FIG. 3 shows noise level distribution for image sequences.

To illustrate an effect of this backward reaching feature of recursive filters, reference is now made to a schematic representation of noise power level curves as per FIG. 3. The noise level NL (shown along the vertical axis) is graphed against frame position t (shown horizontally). The noise level is measured in a suitable quantity, such as statistical variance or standard deviation taken of a background portion of the image or other image area without actual image information (e.g., without grey or color values).

The solid line shows noise level when processed recursively in one direction (from left to right) through the input sequence F and the dotted line shows the noise level when processed recursively the other way, from right to left. In other words, the solid line is the noise level distribution across the left-right intermediate sequence $F^{LR}$ and, accordingly, the dotted line is the noise level distribution across the right-left intermediate sequence $F^{RL}$. Respective initial sections (one including in particular the first frame of the input frame F) have higher noise content than the follow up frames because of the non-zero length of the forward operation window as explained above. Specifically, the first frame cannot be noise-processed at all. The noise content is here the highest. The noise content then gradually drops as the respective recursions progress in the two directions until the noise level eventually stabilizes (in FIG. 3 at about 0.3, but this value is merely a numerical example). In other words, in a single pass processing, the power level distribution over the processed sequence is uneven. In particular, it is monotonically decreasing over the initial section for the processed sequence in direction of processing. This is true for either direction of processing, that is, left-to-right and right-to-left recursions. The noise level is high in an initial section of the sequence in respect to recursion direction. This initial section includes in particular those positions from index t=1 (the first frame) up to index $t=w_{bw}(1<t<w_{bw})$ or (for the right to left sequence $F^{RL}$), positions $T, \ldots, T-w_{bw}$. In short, the notion "initial section" is taken relative to the recursive processing direction. The initial section is hence at least as long as the length of the forward operation window.

The initial section may further comprise a transition section formed from the first few frames having an index higher than $w_{bw}$. The slope of the noise level decreases until the noise level stabilizes and remains essentially constant throughout the remainder of the recursion. The exact number for frames it takes to reach the stabilization will depend on the specifics of the input imagery but at least for fluoroscopic runs, a noise level stabilization can be achieved after about 3-10 frames, but, again, these numbers are not necessarily limiting and will in particular depend on the k-factor function.

The lack of information in the initial section, which leads to this uneven noise level distribution across the processed sequences $F^{LR}$, $F^{RL}$ can be compensated for by the merging of the two intermediate sequences to obtain, in one embodiment, an essentially even or constant noise level distribution through all sequence positions in the output frame $\tilde{F}$. This constant noise profile is shown in FIG. 3 as the dashed curve. The last frame obtained in the right-to-left recursion corresponds to the first frame of the input sequence, but the last frame, because it has been processed from the other direction, now encodes the noise reducing information learned through the second pass recursion from right-to-left. And this additional information can be used when merging for the final output sequence. The same applies in particular to all frames in the initial section.

FIG. 4A shows exemplary X-ray imagery obtainable by a proposed method versus a mere one pass noise processing in the sequence in FIG. 4B. The dosage used is comparable to that in fluoroscopy, one of the preferred applications of the proposed image processor NP.

The three frames a), b) and c) in FIG. 4A show a noise level distribution that is essentially constant across the frames. In distinction to this, the noise level in the first frame a) in sequence 4B is markedly noisier than follow up frames b),c), and this is apparent visually by the coarser image texture in said frame a) of sequence 4B.

The higher image noise in particular in the initial section of a frame sequence may comprise performance of motion compensation. As compared to the sequence in FIG. 4B there are less motion artifacts as in the bi-directionally processed sequence as per FIG. 4A. The test object recorded in the exemplary imagery is a rotating disc which kept spinning whilst the input sequence F has been acquired in an imaging direction along the axis around which the disk spins. To provoke image motion artifacts, a paperclip is attached to the rotating disc. The white arrows in sequence of FIG. 4B indicate the motion artifact caused by the clip's rotation whilst these motion artifacts are no longer present in the corresponding frames of the output sequence FIG. 4A thanks to the improved noise processing. More specifically, this is thanks to the reduced noise achievable even in the frames of the initial section.

It should be noted that all that has been said above in relation to the problem of recursive noise processing, is also present if the recursive noise processing is done with a forward operation window $w_{fw}$. More particularly, in this case, a given frame is noise processed based on information from one, two or more follow up frames. Dual to the backward window operation, in the forward window based recursion it is then towards the end of the sequence where one runs out of information. Again, in this context with forward window noise processing, the bi-directional processing in a two pass-approach and subsequent merging of the two so obtained intermediate sequences can likewise lead to an improved overall reduction of noise level across the whole of the output sequence. In particular, there is substantially constant noise level, even in the terminal section. It should be further understood in the above explanations, that dual to the definition of the initial section, there is a similar definition for "terminal section" for frames towards the end of the recursive progression and frames with indices within the last $w_{fw}$ frames given the left-to-right or right-to-left recursion direction. Hence, all that has been said above in relation to backward window operation applies mutatis mutandis to forward-window-operation based noise recursion.

Figure 5:
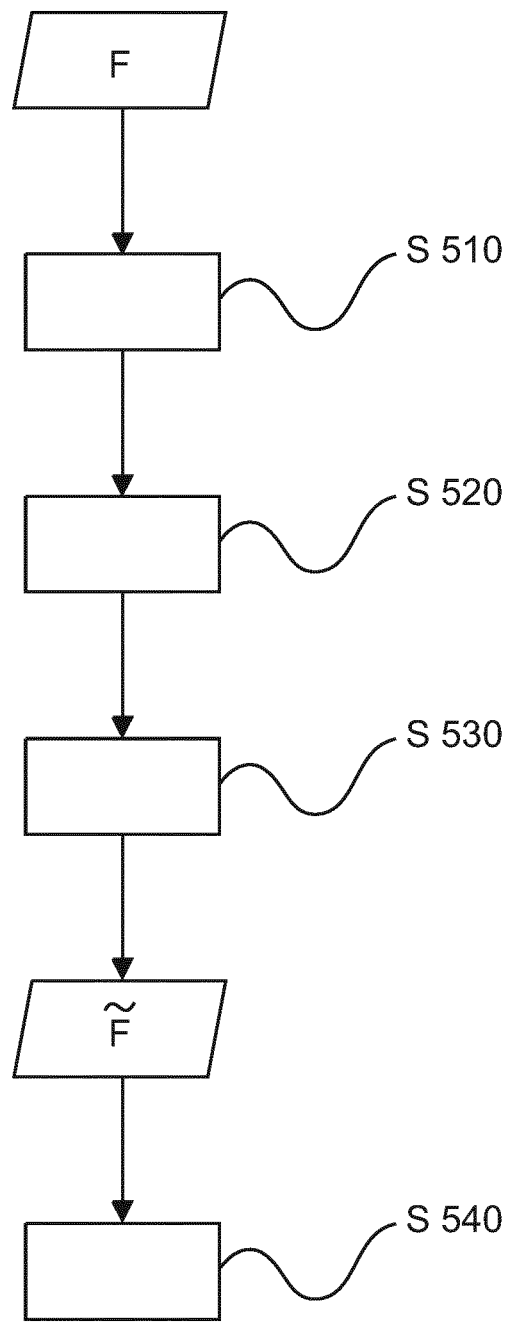
FIG. 5 shows a flow chart of an image processing method.

Reference is now made to FIG. 5 in which an image processing method will be described. It should be noted that the following description of the method steps is not necessarily tied to the architecture as shown and explained in FIGS. 1,2.

At step S510 the input sequence F acquired by an imaging apparatus is received, at least in parts. The image sequence may be directly supplied by the imager or may be retrieved in review mode from a memory such as a database or buffer or other. The individual frames in the input sequence may be received at once or may be supplied one-by-one.

At step S520, a bi-directional temporal noise processing algorithm is applied to the input sequence F. This results in two noise-processed sequences, $F^{LR}$ and $F^{RL}$. The noise processing is recursive. In other words, the recursive processing is applied in a first pass to the input sequence from one end to the other, for instance, from left to right, and is then applied the opposite way from right to left. The order of processing into $F^{LR}$ and $F^{RL}$ is immaterial. Preferably it is the same temporal and recursive noise processing algorithm that is applied in the bi-directional processing although embodiments where different recursive algorithms are used for each direction are also envisaged.

The bi-directional noise processing in step S520 can be implemented in many ways. For instance the input sequence may be processed sequentially, that is, the first pass is processed as described and at the conclusion of the first pass the second pass in the opposite direction is then processed. However, parallel processing by two noise processors may also be envisaged where the recursive temporal noise processing is applied in the first pass in one direction to the input sequence F and the same (or different) noise processing is concurrently applied by another processor in the other direction on a copy of the input sequence. Other implementation variants of the bi-directional recursive noise processing are also envisaged, for instance the noise processing in the two directions is inter-laced. A suitable temporal bi-directional noise processing scheme is as explained above in FIG. 2 but others, non-average based filters, are also envisaged as long as they are recursive.

In one embodiment, in order to carry out the second pass, the input sequence is copied in reversed order (so the last frame corresponds to the first frame of the input sequence). It is then this reversed sequence, $F^{-1}$, that may then be fed into the same noise filtering pipeline to so achieve a simple implementation of the bi-directional processing as proposed herein. However, it will be understood that an actual reversal of the input sequence is not necessarily required as pointer or list variables or similar data processing structures defined on the input sequence F may be used to feed the frames in the two orders into the bi-directional noise filtering algorithm of step S520.

At step S530, the two intermediate sequences $F^{LR}$, $F^{RL}$ produced at step S520 in the bi-directional processing are then at least partly merged or combined to so form the noise processed output sequence $\tilde{F}$.

In step S540 the output sequence $\tilde{F}$ is then further image-processed, for instance stored, displayed as a still images or preferably in a video/cine sequence on the display device by a suitable video processing controller or is otherwise processed, (color-) or otherwise filtered, compressed, etc.

Figure 6:
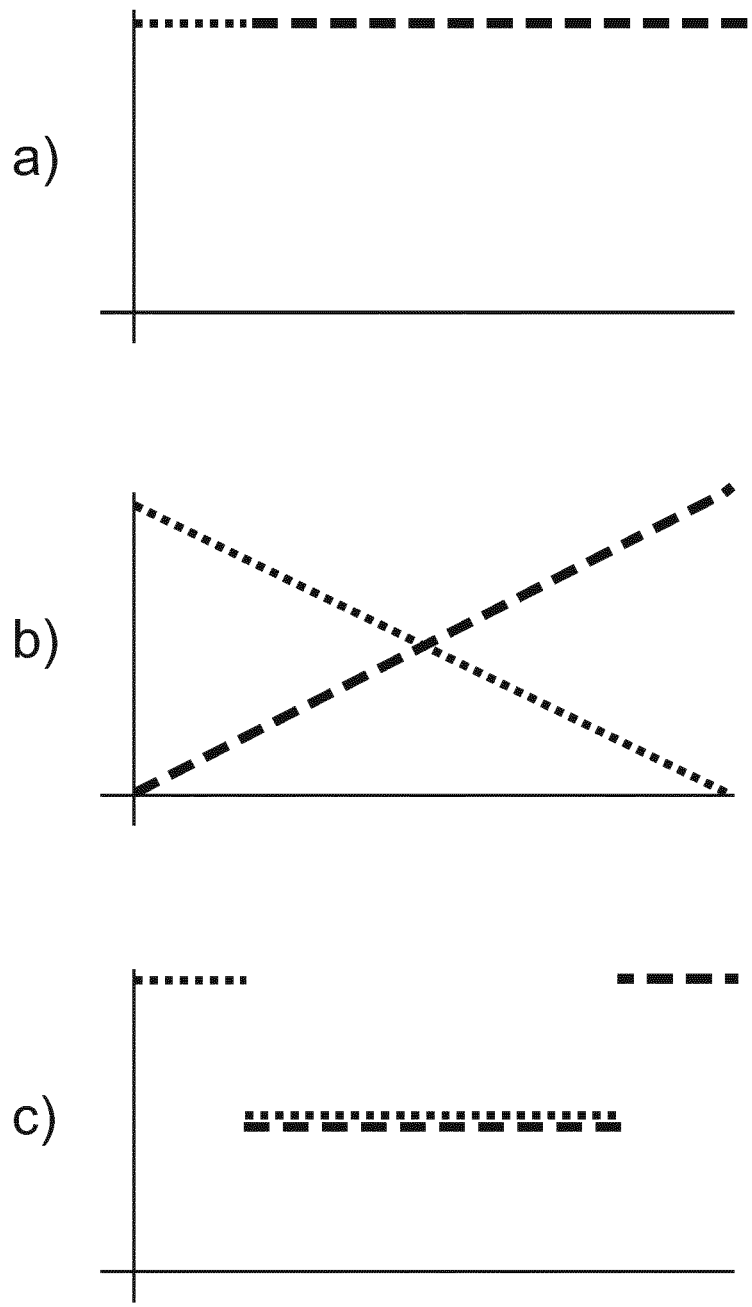
FIG. 6 shows different embodiments of merging image sequences.

For the combining or merging step S530, a number of different embodiments are envisaged and these are now described with particular reference to FIG. 6.

Specifically, in the graphs of FIG. 6, index t of the output sequence F (which is expected to be equal in length to the input sequence and hence to that of the two intermediate sequences) is shown along the horizontal axis. The vertical axis measures the relative contribution of frames from the two intermediate sequences $F^{LR}$, $F^{RL}$ in merging/computing the respective frame of the output sequence. Specifically, in FIG. 6, the dotted curve shows the weight of frames from the left-to-right $F^{LR}$ sequence in the merging operation whilst the dashed curve shows the weight contribution from the right to left sequence $F^{RL}$.

Specifically, in the embodiment of FIG. 6A, frames in the initial section of one of the intermediate sequences (e.g., $F^{LR}$, but this not limiting as the roles of the frames may be reversed) are replaced by corresponding ones from the other intermediate sequence, in this case $F^{RL}$. This approach may be advantageous if a noise filtering scheme with a backward operation window is used. Analogously, frame(s) in the terminal section of one of the sequences can be replaced by corresponding one(s) from the other sequence. This later approach is useful when a forward window is used for the recursive noise processing.

As mentioned earlier, the initial (or terminal) section includes the first (or last) K frames in the sequences $F^{LR}$, $F^{RL}$ (and hence in the output sequence $\tilde{F}$). For instance, the terminal section may be formed only by the very first frame at position t=1 and/or the terminal section may be formed by the very last frame at t=T so the terminal and/or the initial section comprise each a single frame. In particular, and in one embodiment, only the first or the last frames are replaced. Alternatively, the number K of frames to be replaced can be larger than one. Yet more particularly, it is the first K frames (or as the case may be the last K frames) that are being replaced. More particularly still, it is the first K frames in the left to right sequence $F^{LR}$ that is replaced by corresponding ones of the right-to-left sequence $F^{RL}$. This embodiment is useful in particular if the backward operation window as used in step S320 is larger than 1. Preferably then, the number of replaced frames corresponds to the window length. It may also be advantageous to replace more frames still, $w_{bw}+g$ ($g \geq 1$), where g is either fixed or can be adjusted by the user or as a system parameter. Replacement of the frames in the terminal section is useful in particular when the noise processing uses a forward operation window and the above is applicable to this embodiment mutatis mutandis.

The merging embodiment as per FIG. 6A, may be written more formally as a pseudo-code snippet or the case $w_{bw}=1$:— if k<p $\tilde{F}=I[k](x,y)\_merged=F^{RL}[k](x,y)$ else $\tilde{F}=I[k](x,y)\_merged=F^{LR}[k](x,y)$ wherein:
n=number of images in the sequence
k=index in (1 . . . n)
p=number in range 2 . . . n−2 (e.g., a special case is p=n/2, where the run is split into two parts of equal length).

It should be understood that in the above embodiment (and some of the below embodiments) where merging is achieved by (partial) replacement, the replacement operation is to be understood in a general sense for it can be implemented for instance by copying the respective frames into a third frame. Unlike replacing within one of the intermediate sequences to so effect a modification of the respective sequence during the replacement, no such modification takes place when the frames are copied into the third sequence which then forms the output sequence. This later approach has the advantage that both intermediate frames are retained and do not get lost during the processing. On the other hand, if memory constraints are to be heeded (e.g., if the method is implemented as a "mobile app" on a handheld device), a more memory conscious approach can be taken by doing the actual replacement on one of the intermediate sequences itself.

An alternative to merging by replacement is shown in FIG. 6B where progressive averaging from the two intermediate sequences $F^{LR}$ and $F^{RL}$ is used. Specifically, and according to the embodiment in FIG. 6B, the first few (or only the first frame) is replaced by the corresponding frame(s) from the second sequence as in FIG. 6A, whereas the remaining frames are now combined by averaging (in particular by weighted averaging) from the two sequences with the weights changing as a function of index position t. At about the center or middle portion of the output sequence, frames from the two sequences are averaged each with about the same weight. When averaging to form frames towards for the terminal section, weights for frames from the other sequence becomes gradually more dominant. In this manner, a sliding and opposing weighted averaging scheme is implemented where frames from one sequence receive a progressively higher weighting in the averaging at the expense of frames from the other sequence which are weighted less as one progresses through the indices of the output sequence. The FIG. 6B embodiment may be written more formally in pseudo-code fashion as $\tilde{F}=I[k](x,y)\_merged=(k/n)*F^{LR}[k](x,y)+(1-k/n))*F^{RL}[k](x,y))$.

Yet another embodiment for merging is shown in FIG. 6C. Here the frames in one of the sequences are replaced by corresponding ones in the initial section and/or the terminal section as explained above in embodiment FIG. 6A. For indices in the middle section between the terminal and the initial section, the frames are computed by averaging with equal weight from the two intermediate sequences. The FIG. 6C embodiment may be written more formally in pseudo-code as:

if k<p $$\tilde{F}=I[k](x,y)\_merged=F^{LR}[k](x,y)$$

else if k>n−p $$\tilde{F}=I[k](x,y)\_merged=F^{RL}[k](x,y)$$

else $$\tilde{F}=I[k](x,y)\_merged=(F^{LR}[k](x,y)+F^{RL}[k](x,y))/2.$$

As an extension, any section-wise combination of all of the above embodiments A, B and C of FIG. 6 are also envisaged.

The noise level curve obtained for the merging by replacement as per FIG. 6A is similar to the solid curve discussed earlier in FIG. 3. If averaging is used for frames between the initial and terminal section as in FIGS. 6B,C, the noise level will be even lower because the noise information extraction for frames in the middle section (at around the center position) will be maximal and one can expect a slight drop to a lower level noise plateau around said center position. Rather than having an essentially constant noise curve profile throughout as the solid curve in FIG. 3, the noise level has now a dish profile where constant sections to the left and right of the center dip down to the lower level noise plateau. See the sketch of the dashed-dotted curve in FIG. 3 as qualitative example for such a dish profile, that is, a non-constant function with a minimum at the middle region round the center. Specifically, there is lower noise level in the middle section between initial and terminal section of the output sequence.

In either one of the above merging embodiments in FIG. 6, a frame from one intermediate sequence $F^{LR}$ or $F^{RL}$ is said to correspond to another one in the other intermediate sequence, if they are computed for the same frame of the input frame F. In particular, correspondence may be indicated by frames having the same index in the two intermediate sequences $F^{LR}$ and $F^{RL}$. However index equality is not a necessity as during the bi-directional image processing the frames may be re-arranged or re-sorted in the second pass, for instance as indicated above at step S320. If there is a re-sorting of indices involved in the bi-directional recursive processing, this index change can be recorded in a mapping structure which then allows later to track and re-establish the correspondence between the frames across the two sequences.

The proposed two pass noise reduction scheme can be applied to any images, 2D or 3D, or higher dimensional and can be applied in projection or image domain in CT and can be used for imaging other than X-ray, such as ultrasound (US), magnetic resonance (MR) or other, even to optical images.

In one embodiment the two pass bi-directional scheme includes a motion compensation component to reduce artifacts incurred by motion of the imaged object. This can be done as explained above in FIG. 2 where weights of the averaging used for the noise reduction processing is made dependent on the amount of motion detected across the respective images as the noise processing progresses through the input sequence.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium (in particular, but not necessarily, a non-transitory medium), such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An image processor, comprising:
an input interface for receiving an input sequence of frames acquired by an imaging apparatus;
at least one recursive temporal noise reduction filter configured to: bi-directionally process the input sequence of frames into at least two noise processed sequences, including a first noise processed sequence and a second noise processed sequence; and
a merger circuit configured to merge the at least two noise processed sequences into an output sequence, including to replace, at least one frame of the first noise processed sequence with a corresponding at least one frame of the second noise processed sequence and to combine remaining frames by weighted averaging from the at least two noise processed sequences with weights changing as a function of index position of the output sequence.

2. The image processor of claim 1, wherein the merger circuit is configured to replace at least one frame from an initial section of the first noise processed sequence by a corresponding at least one frame from the second noise processed sequence.

3. The image processor of claim 1, wherein a noise level is essentially constant throughout at least an initial or terminal section of the output sequence.

4. A method of image processing, the method comprising:
receiving an input sequence of frames acquired by an imaging apparatus;
applying recursive bidirectional temporal noise reduction processing to the input sequence of frames to produce at least two noise processed sequences, including a first noise processed sequence and a second noise processed sequence; and
merging said at least two noise processed sequences into an output sequence, including replacing, at least one frame of the first noise processed sequence with a corresponding at least one frame of the second noise processed sequence and combining remaining frames by weighted averaging from the at least two noise processed sequences with weights changing as a function of index position of the output sequence.

5. The method of claim 4, wherein said merging includes replacing at least one frame from an initial section of the first noise processed sequence by a corresponding at least one frame from the second noise processed sequence.

6. The method of claim 4, wherein a noise power level is essentially constant throughout at least an initial or terminal section of the output sequence.

7. The method of claim 4 further comprising receiving, at an input interface, the input sequence of frames acquired by the imaging apparatus, wherein the input sequence of frames is any one of i) X-ray frames, ii) ultrasound frames and iii) magnetic resonance frames.

8. The method of claim 4, further comprising: receiving the input sequence of frames; and encoding a moving object based on the received input sequence of frames.

9. A tangible, non-transitory computer-readable medium that stores instructions, which when executed by a processor, causes the processor to perform:
receiving an input sequence of frames acquired by an imaging apparatus;
applying recursive bidirectional temporal noise reduction processing to the input sequence of frames to produce at least two noise processed sequences, including a first noise processed sequence and a second noise processed sequence; and
merging said at least two noise processed sequences into an output sequence, including replacing, at least one frame of the first noise processed sequence with a corresponding at least one frame of the second noise processed sequence and combining remaining frames by weighted averaging from the at least two noise processed sequences with weights changing as a function of index position of the output sequence.

10. A system for image processing, comprising:
a processor;
a tangible non-transitory computer-readable medium that stores instructions, which when executed by the processor, causes the processor to:
receive an input sequence of frames acquired by an imaging apparatus;
apply recursive bidirectional temporal noise reduction processing to the input sequence of frames to produce at least two noise processed sequences, including a first noise processed sequence and a second noise processed sequence; and
merge the at least two noise processed sequences into an output sequence, including replace, at least one frame of the first noise processed sequence with a corresponding at least one frame of the second noise processed sequences and combine remaining frames by weighted averaging from the at least two noise processed sequences with weights changing as a function of index position of the output sequence.

11. The system of claim 10, wherein a noise power level is essentially constant throughout at least an initial or terminal section of the output sequence.

12. The system of claim 10, wherein the tangible non-transitory computer-readable medium stores further instructions, which when executed by the processor, cause the processor to receive, at an input interface, the input sequence of frames acquired by the imaging apparatus, wherein the input sequence of frames is any one of i) X-ray frames, ii) ultrasound frames and iii) magnetic resonance frames.

13. The system of claim 10, wherein the tangible non-transitory computer-readable medium stores further instructions, which when executed by the processor causes the processor to receive the input sequence of frames, and encode a moving object.

14. An image processor, comprising:
an input interface for receiving an input sequence of frames acquired by an imaging apparatus;
at least one recursive temporal noise reduction filter configured to: bi-directionally process the input sequence of frames into at least two noise processed sequences, including a first noise processed sequence and a second noise processed sequence, and to process pixels in the input sequence of frames spatially within each frame during temporal noise reduction processing; and
a merger circuit configured to merge the at least two noise processed sequences into an output sequence, including to replace, at least one frame of the first noise processed sequence with a corresponding at least one frame of the second noise processed sequence and to combine remaining frames by weighted averaging from the at least two noise processed sequences with weights changing as a function of index position of the output sequence.

15. The image processor of claim 14, wherein the merger circuit is configured to replace at least one frame from an initial section of the first noise processed sequence by a corresponding frame from the second noise processed sequence.

16. The image processor of claim 14, further comprising a motion compensator circuit implemented by normalized weights.

\* \* \* \* \*